Jan. 21, 1969  R. C. GLOPPEN  3,423,077
ADJUSTABLE WEIR
Filed June 17, 1966
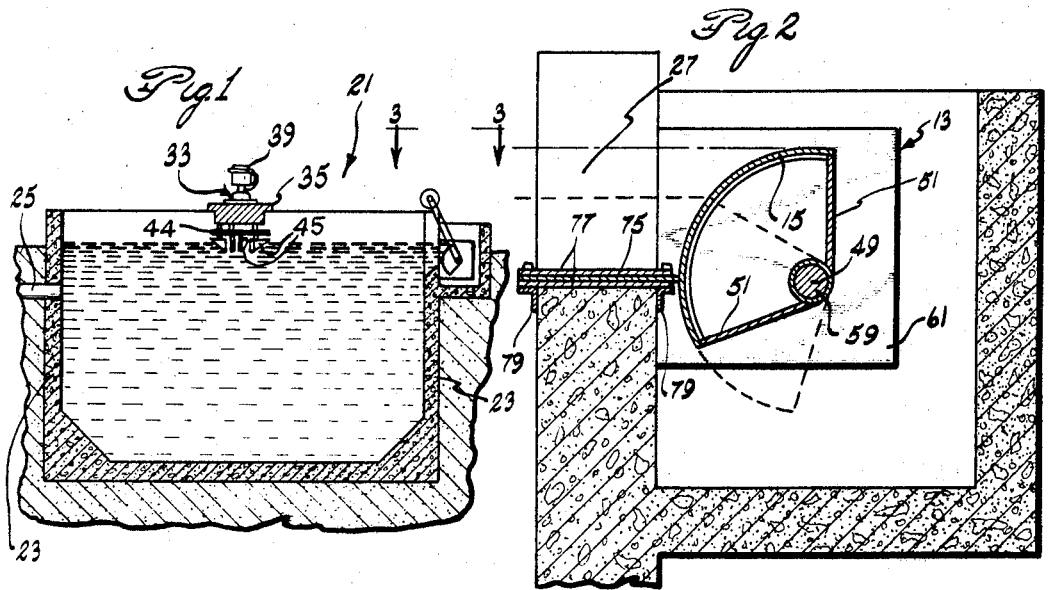
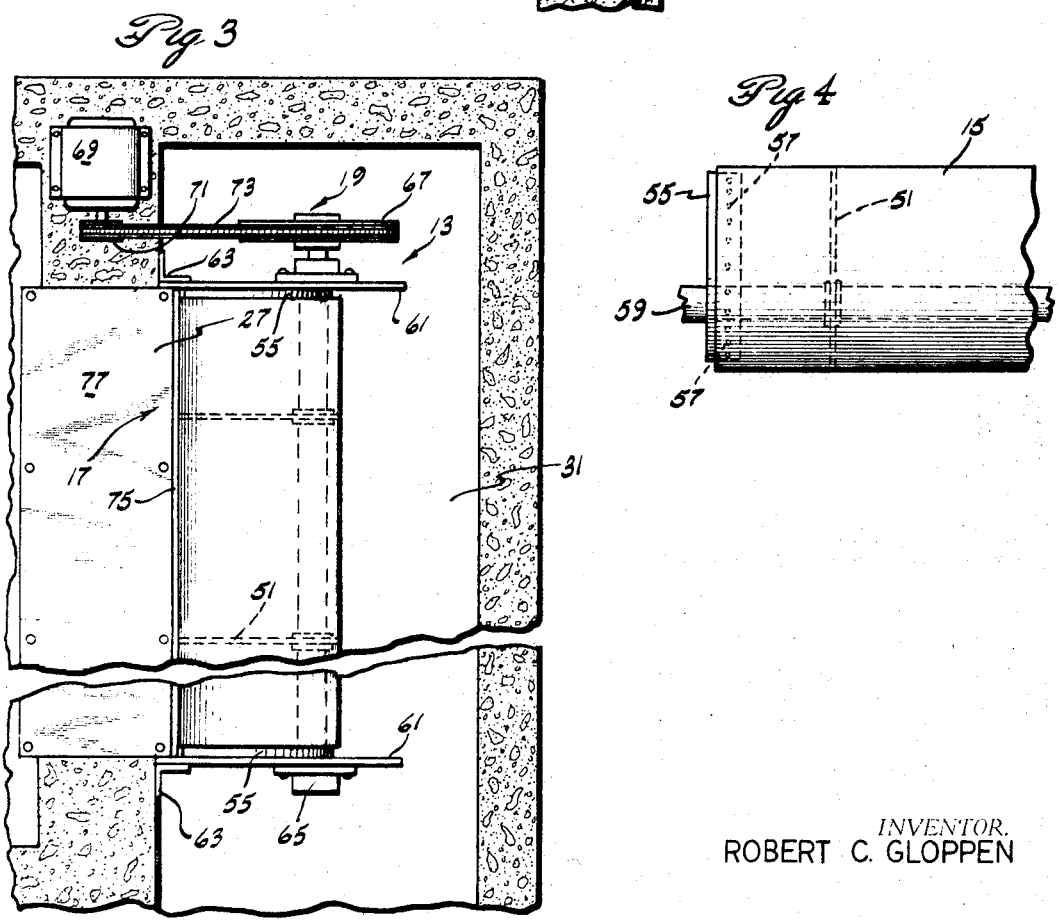
INVENTOR.
ROBERT C. GLOPPEN
BY Anderson, Luedeka, Fitch, Even, & Tabin
ATTORNEYS United States Patent Office 3,423,077
Patented Jan. 21, 1969

3,423,077
ADJUSTABLE WEIR
Robert C. Gloppen, Park Ridge, Ill., assignor to Yeomans Brothers Company, Melrose Park, Ill., a corporation of Delaware
Filed June 17, 1966, Ser. No. 558,459
U.S. Cl. 261—91           4 Claims
Int. Cl. C02b 9/00

ABSTRACT OF THE DISCLOSURE

Waste treatment apparatus utilizing a mechanical surface aerator having a rotor equipped with a plurality of vanes. The level of fluid surface in the tank is remotely varied by rotating a motor-driven weir located in the outlet passageway. The outlet weir includes a rotatably mounted gate-member having a convex surface and effects a change in fluid surface level in the tank that is non-linear relative to the amount of rotation of the shaft.

---

This invention relates generally to an adjustable weir for controlling the flow of fluid and more particularly relates to an adjustable weir for controlling the level of fluid in a tank having an elongated outlet.

While the illustrated embodiment of this invention is particularly adapted for controlling the flow of effluent discharged from a sewage aeration tank employing mechanical surface aerators, certain features of this invention may be utilized to control fluid flow in a variety of applications. A frequently used system for the treatment of sewage includes a presettling tank or suitable screening device where the larger settleable sewage materals are separated out of the liquid. After this separation, the sewage is passed to an aeration tank wherein it is inoculated with a bacteria-containing "activated" sludge obtained from a previous treatment of sewage. The sewage is then aerated to promote the growth of bacteria and facilitate the decomposition of the sewage. The discharge from the aeration tank is fed into a settling tank wherein the sludge is separated from the liquid.

The flow and strength of sewage into the system is usually not on a constant basis and may reach peaks at various times during a day, as for example in the morning and evening. Aeration tanks in general use, such as those employing mechanical surface aerators, are provided with a non-adjustable discharge outlet which permits the sewage to discharge from the tank when a predetermined sewage level is reached. With such non-adjustable discharge outlets, the rate of discharge is usually at the rate of sewage inflow. Because sewage should be aerated to minimum standards, under varying organic load conditions, it may be necessary to operate the aerator to introduce oxygen into the fluid at increased or decreased rates. However, with a mechanical surface aerator in such a non-adjustable outlet tank, the main variable which may be altered to change the rate of aeration is the speed at which the mechanical aerator is driven. A more flexible system is desirable since there is an upper limit to the speed at which such an aerator may be driven and provide efficient aeration.

A main object of this invention is to provide an adjustable weir having excellent operating characteristics. A more particular object is to provide an improved adjustable weir adapted for controlling relatively large elongated outlets. A still further object is to provide an adjustable weir including an improved sealing means. Another object is to provide a weir adapted to vary the level of fluid in a sewage aeration tank. Other objects and advantages of the invention will become apparent through reference to the following description and accompanying drawing which shows an illustrated embodiment of this invention, in which:

FIGURE 1 is an elevational view of a sewage aeration tank in association with an adjustable weir having various features of the present invention;

FIGURE 2 is an enlarged fragmentary view of a portion of the apparatus illustrated in FIGURE 1;

FIGURE 3 is an enlarged fragmentary view taken along the line 3—3 of FIGURE 1; and FIGURE 4 is an enlarged fragmentary view of a portion of a component of the apparatus illustrated in FIGURE 3.

Briefly, an adjustable weir 13 is illustrated which is particularly adapted for controlling the level of fluid in a tank. The weir 13 includes a gate member 15 having a convex surface. The convex surface of the gate member 15 is disposed for selectively obstructing the outlet of the tank. To permit the flow of fluid other than over the top of the gate member 15, a sealing means 17 is provided. To selectively vary the height of the upper edge of the gate 15, a positioning means 19 is provided.

The apparatus is illustrated in connection with a sewage aeration tank 21 which is square, having four vertical walls 23 preferably constructed of concrete or other durable material. The bottom of the tank is slightly inclined towards the central portion so that the sludge does not settle in the corners. To permit the influent to enter the tank 21, an inlet 25 is provided. To permit effluent discharge from the tank 21, an elongated effluent outlet 27 is provided at the top of the right-hand wall 23. The discharge outlet 27, as illustrated in FIGURE 3, spans substantially the entire length of the tank wall 23. To conduct the effluent which is discharged through the outlet 27 to a settling tank (not shown), a discharge trough 31 is provided.

Surface aeration means 33 is located centrally in the tank as illustrated in FIGURE 1, suitably supported, as from a bridge 35 extending across the tank. Positioned above the bridge 35 is a motor 39 coupled by means of a suitable gear box to a drive shaft. Secured to the drive shaft is a rotor 44 having a plurality of vanes 45 which project the fluid out over the surface of the liquid and create an upward movement of fluid from the bottom of the tank 21 in the central portion thereof. An example of one type of mechanical surface aerator is described in detail in U.S. Patent No. 2,323,437.

The illustrated adjustable weir 13 includes a gate member 15 which is in the form of a cylindrical segment. While the cylindrical segment of the illustrated embodiment is in the form of a curved shell, a solid segment may be used. The gate member 15 displays a convex surface with the central axis of the cylindrical segment being located at approximately the point 49 as viewed in FIGURE 2. The gate 15 is supported by a plurality of spatially positioned radial support ribs 51. The weir 13 is provided with sealing means 17 which, in the illustrated embodiment, include two arcuately shaped gaskets 55 which are secured to the longitudinal ends of the member 15 by rivets 57 as clearly illustrated in FIGURE 4. As illustrated, the gaskets 55 extend from the ends of the member 15 and are preferably constructed of a resilient material such as synthetic rubber, neoprene, Teflon or the like.

The gate member 15 is rotatably supported upon a shaft 59, the axis of which is coincident with the axis of the member 15. To support the shaft 59, two baffle support plates 61 are secured to the wall 23 by angle iron brackets 63. The shaft 59 is journaled through the baffle plates 61 and maintained in position by means of bearings 65. As illustrated in FIGURE 2, one end of the shaft 59 is secured to a large sprocket 67. The sprocket 67 may be manually turned, but preferably it is driven by a control motor 69. The shaft of the motor 69 is provided with a small sprocket 71 which is coupled by means of a chain 73 to the sprocket 67. The control motor 69 is mounted atop the tank 21 and is selectively actuated by suitable control means (not shown). To facilitate positioning of the gate member 15, the motor 69 is preferably of a type the rotation of which may be readily reversed.

To prevent fluid from flowing along undesired paths, the gate member 15 is provided with a sealing means which in the illustrated embodiment comprises an elongated flat gasket 75. The gasket 75 may be constructed of any suitable resilient material such as synthetic rubber, neoprene, Teflon or the like. The gasket 75 is secured to the wall 23 by retaining plates 77 which are held in position by brackets 79 secured to the wall 23. As illustrated, the longitudinal edge of the gasket 75 is adjacent the gate member 15, thereby providing a fluid-tight seal.

In operation, sewage is continuously introduced into the tank 21 through the inlet 25. The fluid sewage within the tank 21 contains bacteria-containing sludge from previous sewage treatments. The motor 39 drives the vanes 45 in rotary movement. The rotation of the vanes 45 keeps the sewage in motion throughout the tank and distributes it over the surface of the liquid within the tank thereby aerating the liquid and promoting the growth of bacteria.

As previously mentioned, the amount of sewage inflow and/or strength during normal operation is not constant, but varies throughout the day. To accommodate variation in sewage strength and/or flow throughout the day, so that the sewage is properly aerated before it leaves the tank 21, the weir 13 is adjusted in a suitable manner to raise or lower the fluid level and/or vary the quantity discharged over the weir. The amount of horsepower required to drive the rotor 44 is dependent upon the speed at which the rotor is driven and upon the depth the vanes 45 are submerged. However, the greater the depth of submergence, the greater is the amount of aeration which is accomplished. Accordingly when the strength of the sewage increases, submergence to a greater depth may be used to increase the aeration rate.

During the periods of highly increased influent flow, it may be desirable to rotate the gate member 15 in a counterclockwise direction, as viewed in FIGURE 2. During such a period, there will be an accompanying rise in the level of fluid in the tank 21, and it is possible that oversubmergence of the rotor blades might occur. Thus, the weir may be lowered slightly to inrease the quantity discharged and prevent oversubmergence, although allowing some increase in the depth of submergence of the vanes 45 to provide a greater rate of aeration. If the strength of the highly increased influent flow is such as to require still further additional aeration, the speed of rotation of the aerator may be increased.

The gate member 15 may also be rotated counterclockwise, as to the phantom position illustrated in FIGURE 2, to lower the fluid level in the tank 21 when the strength of the sewage decreases. In such an instance, the depth of submergence will be less and the power requirements to the aerator accordingly less. These results are desirable when the aeration demand is low.

The resilient gaskets 55 and 75 restrict the leakage of sewage past the sides and bottom of the gate thereby directing the flow of sewage over the uppermost portion of the gate member 15 as viewed in FIGURE 2. The particular cylindrical construction of the gate member 15 and the use of a single shaft 59 that is radially equidistant from the entire convex surface provides a rigid but readily adjustable construction. The surface of the gate member 15 against which gasket 75 bears is maintained at a precise spatial reference point so that a good seal between gasket 75 and the convex surface is obtained.

The change in fluid level in the tank is non-linear with the amount of rotation of the gate i.e., each degree of angular rotation of the gate member 15 does not produce a corresponding increment of change in the level in the tank 21. However, if desired, a variety of other convex surface configurations may be utilized to provide different adjustment patterns.

Although but one specific embodiment of this invention has been hereinafter shown and described, it will be understood that the details and construction shown may be altered without departing from the spirit of this invention as defined by the following claims.

I claim:

1. Waste treatment apparatus comprising a tank for receiving a quantity of fluid material, said tank having outlet passageway means and having inlet passageway means for inflow of fluid material to be treated, mechanical surface aerator means disposed within said tank, said surface aerator means including a rotor which is rotatable about a vertical axis and which has a plurality of vanes located at about the fluid surface level in said tank, an adjustable weir disposed in said outlet passageway means for controlling the vertical level of fluid material within said tank, said weir including a gate member displaying a convex surface disposed adjacent the fluid material in said tank and including sealing means in surface contact with said convex surface for restricting the flow of fluid between said gate member and said tank, said gate member being rotatably mounted on a shaft supported by said tank, and means for rotating said gate member about said shaft to raise or lower the vertical height of fluid material within said tank an amount which is non-linear with the amount of rotation of said gate member and thereby change the depth of submergence of said vanes and accordingly change the aeration rate of said surface aerator means.

2. Treatment apparatus in accordance with claim 1 wherein said gate member has a cylindrical surface and is secured to said shaft which shaft is located at the axis of said cylinder, said shaft being supported on said tank at a location where it is below the normal fluid surface level in said tank.

3. Waste treatment apparatus in accordance with claim 2 wherein a pair of baffle plates are each supported by said tank and are each spatially positioned adjacent one end of said cylindrical gate member, said shaft being journalled in said baffle plates, and wherein said gate-member rotating means includes a motor supported by said tank which motor is drivingly connected to a portion of said shaft which extends through one of said baffle plates.

4. Waste treatment apparatus comprising a tank for receiving a quantity of fluid material, said tank having outlet passageway means formed in one sidewall thereof and having inlet passageway means for inflow of fluid material to be treated, mechanical surface aerator means disposed within said tank, said surface aerator means including a rotor which is rotatable about a vertical axis and which has a plurality of vanes located at about the fluid surface level in said tank, an adjustable weir disposed in said outlet passageway means for controlling the vertical level of fluid material within said tank, said weir including a gate member displaying a convex surface disposed adjacent the fluid material in said tank and including sealing means in surface contact with said convex surface for restricting the flow of fluid between said gate member and said tank, said gate member including a section of the surface of a cylinder which is affixed to a shaft at the axis of the cylinder, which shaft is rotatably mounted on said sidewall, and means including a motor for rotating said shaft and gate to raise and lower the vertical height of the fluid material within said tank an amount which is non-linear with the amount of rotation of said gate member and thereby change the depth of submergence of said vanes and accordingly change the aeration rate of said surface aerator means.

(References on following page)

References Cited

UNITED STATES PATENTS

| | | | |
|---|---|---|---|
| 1,139,104 | 5/1915 | Collar | 61—26 |
| 1,531,474 | 3/1925 | Becher | 61—22 |
| 1,726,522 | 9/1929 | Ambursen | 61—26 |
| 2,077,445 | 4/1937 | Wallace et al. | |
| 3,176,469 | 4/1965 | Fowler | 61—22 |
| 3,329,407 | 7/1967 | Clough et al. | 261—91 XR |

FOREIGN PATENTS 957,750  5/1964  Great Britain.

HARRY B. THORNTON, *Primary Examiner.*

T. R. MILES, *Assistant Examiner.*

U.S. Cl. X.R.

61—22